# (12) United States Patent
Karaoguz et al.

(10) Patent No.: US 8,209,382 B2
(45) Date of Patent: Jun. 26, 2012

(54) MEDIA EXCHANGE NETWORK SUPPORTING CONSUMPTION OF BROADCAST AND USER CAPTURED MEDIA

(75) Inventors: Jeyhan Karaoguz, Irvine, CA (US); James D. Bennett, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 1250 days.

(21) Appl. No.: 10/667,833

(22) Filed: Sep. 22, 2003

(65) Prior Publication Data

US 2004/0148353 A1 Jul. 29, 2004

Related U.S. Application Data

(60) Provisional application No. 60/445,500, filed on Feb. 6, 2003, provisional application No. 60/432,472, filed on Dec. 11, 2002, provisional application No. 60/443,894, filed on Jan. 30, 2003, provisional application No. 60/457,179, filed on Mar. 25, 2003.

(51) Int. Cl.
G06F 15/16 (2006.01)
H04N 7/173 (2011.01)

(52) U.S. Cl. ........... 709/205; 709/206; 709/230; 725/98

(58) Field of Classification Search .................. 709/205, 709/206, 230; 725/98
See application file for complete search history.

(56) References Cited

U.S. PATENT DOCUMENTS

| | | | |
|---|---|---|---|
| 5,721,678 A * | 2/1998 | Widl | 705/417 |
| 6,233,428 B1 | 5/2001 | Fryer | |
| 6,477,708 B1 * | 11/2002 | Sawa | 725/116 |
| 6,631,247 B1 * | 10/2003 | Motoyama et al. | 399/8 |
| 6,665,384 B2 | 12/2003 | Daum | |
| 6,693,896 B1 * | 2/2004 | Utsumi et al. | 370/352 |
| 6,769,127 B1 * | 7/2004 | Bonomi et al. | 725/39 |
| 6,774,926 B1 | 8/2004 | Ellis | |
| 6,829,033 B2 | 12/2004 | Hose | |
| 6,963,358 B2 * | 11/2005 | Cohen et al. | 348/207.1 |
| 7,003,795 B2 | 2/2006 | Allen | |
| 7,065,778 B1 * | 6/2006 | Lu | 725/98 |
| 7,075,573 B2 * | 7/2006 | Imaeda | 348/231.99 |
| 7,321,969 B2 | 1/2008 | Schoen | |
| 2002/0002039 A1 | 1/2002 | Qureshey | |
| 2002/0016971 A1 | 2/2002 | Berezowski | |
| 2002/0154892 A1 * | 10/2002 | Hoshen et al. | 386/87 |
| 2003/0043272 A1 * | 3/2003 | Nagao et al. | 348/207.1 |
| 2003/0115585 A1 * | 6/2003 | Barsness et al. | 725/9 |
| 2004/0003040 A1 | 1/2004 | Beavers | |
| 2004/0003051 A1 | 1/2004 | Krzyzanowski | |
| 2004/0125789 A1 | 7/2004 | Parker | |
| 2005/0028208 A1 | 2/2005 | Ellis | |

* cited by examiner

*Primary Examiner* — Djenane Bayard
*Assistant Examiner* — Umar Cheema
(74) *Attorney, Agent, or Firm* — Garlick & Markison; Bruce E. Garlick

(57) ABSTRACT

A network and methods for supporting concurrent consumption of broadcast and user captured media content are disclosed. Various embodiments of the present invention permit a first user to concurrently consume media content from a server and a second user of a media exchange network. The first user may also concurrently provide media content to the second user of the media exchange network. The media content shared by users may be stored at a user's location, stored on a server at a third location in the media exchange network, or may originate from a media peripheral device, and may be audio, a still image, video, or data.

48 Claims, 13 Drawing Sheets

| CHANNEL LINE UP | <<1PM | 2PM | ... | 6PM | 7PM>> |
|---|---|---|---|---|---|
| | | | HOUR, DAY | | |
| FAMILY VACATIONS | | | | | |
| KID's SPORTS | | | | | |
| ... | | | | | |
| VACATION in ALASKA VIDEO  802 | Normal Estimated Delivery Time: 2 hrs 13 min Cost: 59¢ (without Queuing) | | | Showing All Day (48 Min), Earliest Order Time: 4:00PM MPEG-2 1.5 Mbps | |
| VACATION in ALASKA VIDEO  803 | Express Estimated Delivery Time: 18 min Cost: $1.2 (with Queuing) | | | Showing All Day (48 Min), Earliest Order Time: 4:00PM MPEG-2 4 Mbps | |
| VACATION in ALASKA VIDEO  804 | Overnight Delivery: Avail Nxt Morning Cost: 5¢ (Server Stored) | | | Showing All Day (48 Min), Earliest Order Time: 4:00PM MPEG-2 19 Mbps | |

MEDIA EXCHANGE NETWORK SUPPORTING CONSUMPTION OF BROADCAST AND USER CAPTURED MEDIA

CROSS-REFERENCE TO RELATED APPLICATIONS/INCORPORATION BY REFERENCE

This application makes reference to, and/or claims priority to, and/or claims the benefit of United States Provisional Patent Application 60/445,500, entitled "Common Media Consumption Across Multiple Media Processing Systems Via Single User Control", filed Feb. 6, 2003, U.S. Provisional Application Ser. No. 60/432,472, entitled "Personal Inter-Home Media Exchange Network", filed Dec. 11, 2002, and U.S. Provisional Application Ser. No. 60/443,894, entitled "Personal Access And Control Of Media Peripherals On A Media Exchange Network", filed Jan. 30, 2003, the complete subject matter of which are hereby incorporated herein by reference, in their entirety. In addition this application makes reference to U.S. Provisional Patent Application Ser. No. 60/457,179, entitled "Server Architecture Supporting A Personal Media Exchange Network", filed Mar. 25, 2003, U.S. patent application Ser. No. 10/657,390, entitled "Personal Inter-Home Media Exchange Network", filed Sep. 8, 2003, and U.S. patent application Ser. No. 10/660,267 entitled "Personal Access And Control Of Media Peripherals On A Media Exchange Network", filed Sep. 11, 2003, the complete subject matter of which are hereby incorporated herein by reference, in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Today, two or more parties at two or more different locations may each watch the same commercial TV (television) broadcast on their respective TV sets. The two or more parties may contact each other using telephones and discuss, in real time, the commercial TV broadcast that they are all watching. The two or more parties may also contact each other using two-way radios such as, for example, walkie-talkies, citizen band radios, or amateur radios. Also, the two or more parties may use PC's (personal computers) to communicate with each other during the commercial TV broadcast using, for example, instant messaging or email. Each of these methods of communication establishes a communication path that, though concurrent with the commercial TV broadcast, is independent of the commercial TV broadcast.

The creation of a communication link between at least two parties may take many forms. The communication link may be a one-way link from a first party to at least one other party, or a two way-link between two or more parties.

For example, a two-way link may comprise a telephone land-line or cell phone link between a caller at a first location and another person at a second location. Another example of a two-way link is a video conference link between a group of people at a first corporation and another group of people at a second corporation conducting a meeting. A two-way radio link between two children with walkie-talkies is another example. Also, a link from a user's PC to a web page on the Internet is considered a two-way link where the user clicks on certain displayed icons and the web page server sends back the associated information.

A one-way link may comprise, for example, a commercial TV broadcast link from a local TV station to a user's television set in their home. Another example of a one-way link is a one-way commercial radio broadcast link from a radio station to a user's radio in their home. Also, an email link may be considered a one-way link where a user of a PC sends an email message over the Internet, for example, to a second party.

The communication links may be wired or wireless and may also be direct or indirect. For example, a wired link may comprise a cable TV link between a cable head end and a user's television set. A wireless link may comprise, for example, a cell phone connection via a cell tower. A direct link may comprise, for example, a first walkie-talkie communicating via a direct line of sight with a second walkie-talkie. An indirect link may comprise, for example, an Internet communication link from a first PC to a second PC via several servers, routers, and hubs.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention may be found in a system supporting concurrent consumption of media from multiple sources. Such a system may comprise a first television display in a first home, a first storage in the first home that stores a first media, and a second television display in a second home. The first storage may have an associated first network protocol address, and the second storage may have an associated second network protocol address. An embodiment of the present invention may also comprise at least one server for storing and distributing 3rd party media, and a communication network. It may comprise server software that receives a request that identifies one of the associated first and second network protocol addresses and responds by identifying the other of the associated first and second network protocol addresses. The server software in such an embodiment may support delivery via the communication network of the 3rd party media from the at least one server and the first media from the first storage, to the second home. Such an embodiment may support delivery of the 3rd party media from the at least one server, to the first home, for concurrent consumption of the 3rd party media by the first television display, and the 3rd party media and the first media by the second television display.

The first media in an embodiment of the present invention may comprise at least one of audio, a still image, video, and data, and the first media may be real-time video. The 3rd party media may comprise at least one of audio, a still image, video, and data. The first and second network protocol addresses may be one of an Internet protocol (IP) address, a media access control (MAC) address, and an electronic serial number (ESN), and the at least one server may comprise at least one of a 3rd party media provider, a 3rd party service provider, and a broadband head end.

In an embodiment in accordance with the present invention, the communication network may comprise at least one of a cable infrastructure, a satellite network infrastructure, a digital subscriber line (DSL) infrastructure, an Internet infrastructure, an intranet infrastructure, a wired infrastructure, and a wireless infrastructure. The communication network may be the Internet. The consuming may comprise at least one of playing digitized audio, displaying a still image, displaying video, and displaying data.

Another embodiment may comprise at least one first media peripheral communicatively coupled to the first storage. The at least one first media peripheral may comprise at least one of a digital camera, a digital camcorder, a television, a personal computer, a CD player, a home juke-box, a mobile multi-media gateway, a multi-media personal digital assistant, a DVD player, a tape player, and a MP3 player.

In yet another embodiment, the system may comprise at least one second media peripheral communicatively coupled to the second storage. In such an embodiment, the server software may support delivery of the second media from the second storage to the first home for concurrent consumption of the 3rd party media and the second media by the first television display. The at least one second media peripheral may comprise at least one of a digital camera, a digital camcorder, a television, a personal computer, a CD player, a home juke-box, a mobile multi-media gateway, a multi-media personal digital assistant, a DVD player, a tape player, and a MP3 player. Another embodiment may comprise a media guide interface for displaying media availability.

Additional aspects of the present invention may be found in a system supporting concurrent consumption of media from multiple sources. An embodiment of the present invention may comprise a first storage in a first home that stores a first media, a second television display in a second home, and at least one server for storing and distributing 3rd party media. The first storage may have an associated first protocol address, and the second storage may have an associated second protocol address. An embodiment may comprise set top box circuitry, in the first home, communicatively coupled to deliver the first media from the first storage to the second television display concurrent with consumption, at the first home, of at least the 3rd party media. An embodiment may comprise a communication network, and server software that receives a request that identifies one of the associated first and second protocol addresses and responds by identifying the other of the associated first and second protocol addresses. Such an embodiment may support delivery via the communication network of the 3rd party media from the at least one server and the first media from the first storage, to the second television display for concurrent consumption of the 3rd party media and the first media.

In various embodiments of the present invention, the first media may comprise at least one of audio, a still image, video, and data. The first media may be real-time video. The 3rd party media in an embodiment of the present invention may comprise at least one of audio, a still image, video, and data, and the first and second protocol addresses may be one of an Internet protocol (IP) address, a media access control (MAC) address, and an electronic serial number (ESN). The at least one server comprises at least one of a 3rd party media provider, a 3rd party service provider, and a broadband head end.

The communication network in an embodiment of the present invention may comprise at least one of a cable infrastructure, a satellite network infrastructure, a digital subscriber line (DSL) infrastructure, an Internet infrastructure, an intranet infrastructure, a wired infrastructure, and a wireless infrastructure, and the communication network may be the Internet.

Another embodiment of the present invention may comprise at least one first media peripheral communicatively coupled to the first storage. The at least one first media peripheral may comprise at least one of a digital camera, a digital camcorder, a television, a personal computer, a CD player, a home juke-box, a mobile multi-media gateway, a multi-media personal digital assistant, a DVD player, a tape player, and a MP3 player.

Further aspects of the present invention may be observed in a system supporting concurrent consumption of media from multiple sources. An embodiment of the present invention may comprise a first storage in a first home that stores a first media, a second television display in a second home, and at least one server for storing and distributing 3rd party media. It may also comprise set top box circuitry, in the second home, communicatively coupled to receive the first media from the first storage and the 3rd party media from the at least one server, for concurrent consumption by the second television display. In addition, an embodiment may comprise a communication network, and server software that coordinates delivery via the communication network of the first media from the first storage and the 3rd party media from the at least one server to the set top box circuitry. The first media and the 3rd party media may comprise at least one of audio, a still image, video, and data. The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure. Another embodiment of the present invention may comprise at least one media peripheral communicatively coupled to the first storage. The at least one media peripheral may comprise at least one of a digital camera, a digital camcorder, a television, a personal computer, a CD player, a home juke-box, a mobile multi-media gateway, a multi-media personal digital assistant, a DVD player, a tape player, and a MP3 player. In addition, an embodiment may comprise a media guide interface for displaying and coordinating media availability.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 8 is an exemplary illustration of a TV guide channel user interface showing several options of a pushed media in accordance with an embodiment of the present invention.

DETAILED DESCRIPTION OF THE INVENTION

Certain embodiments of the present invention relate the concurrent consumption of media. In particular, certain embodiments of the present invention relate to the concurrent consumption of a first media content and a second media content in a media exchange network, where the second media content comprises real-time user-captured media content.

Figure 1A:
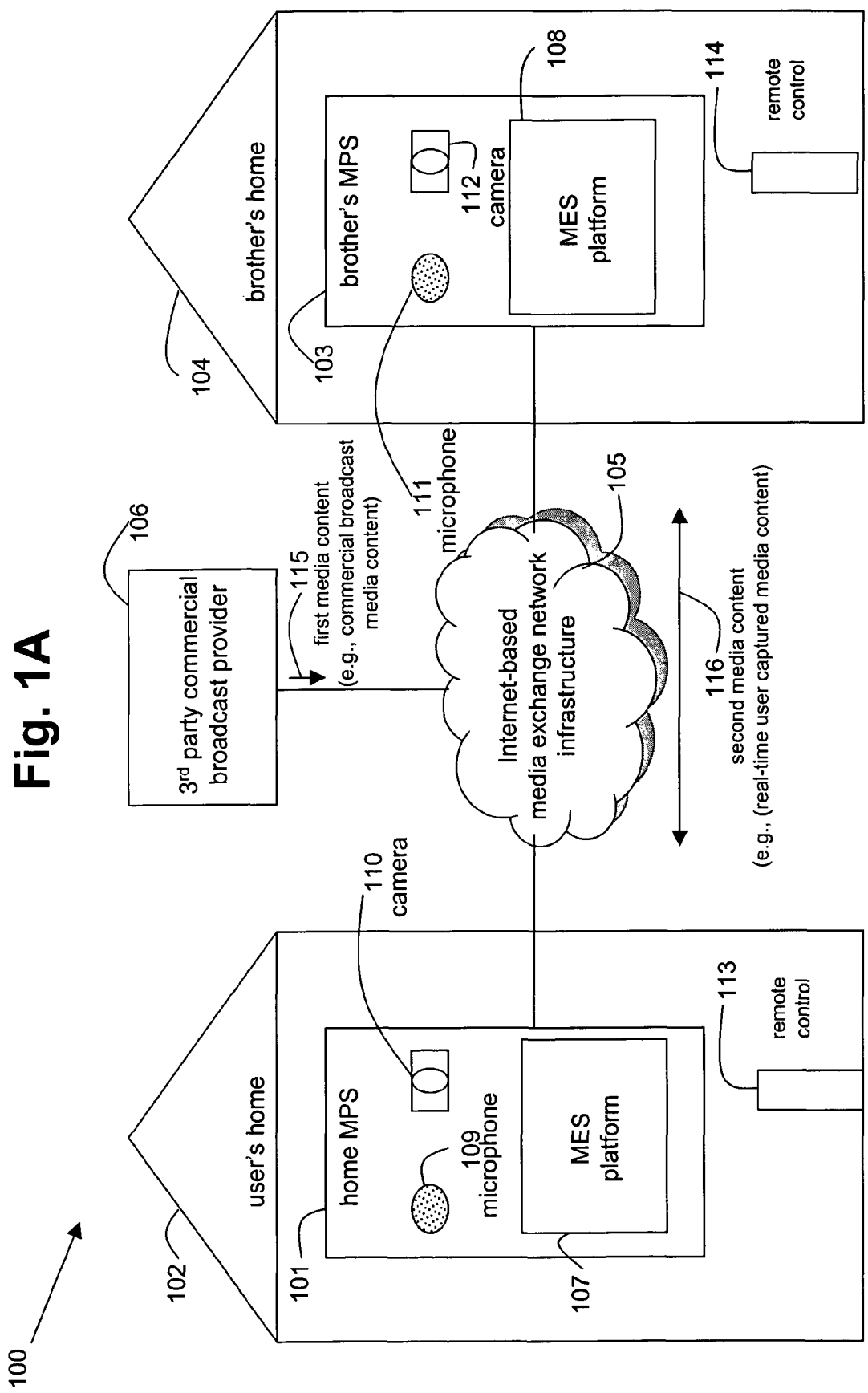
FIG. 1A is a diagram illustrating an embodiment of a media exchange network supporting the concurrent consumption of a first media content and a second media content, in accordance with various aspects of the present invention.

FIG. 1A is a diagram illustrating an embodiment of a media exchange network 100 supporting the concurrent consumption of a first media content 115 and a second media content 116, in accordance with various aspects of the present invention. The first media content 115 may comprise commercial broadcast media content and the second media content 116 may comprise real-time user-captured media content, in accordance with an embodiment of the present invention.

The media exchange network 100 is a communication network comprising a home MPS (media processing system) 101 at a user's home 102, a brother's MPS 103 at a brother's home 104, a $3^{rd}$ party commercial broadcast provider 106, and an Internet-based media exchange network infrastructure 105 connecting together the home MPS 101, the brother's MPS 103, and the $3^{rd}$ party commercial broadcast provider 106.

The MPS 101 comprises a MES (media exchange software) platform 107 and the MPS 103 comprises a similar MES platform 108. The MES platforms 107 and 108 provide certain functionality within the MPS's 101 and 103, respectively, such as the ability to capture and process media content on the media exchange network 100. Also, the MES platforms 107 and 108 provide the ability for a user to push media content on the media exchange network 100 via the Internet-based media exchange network infrastructure 105.

The home MPS 101 also comprises a microphone 109 and a video camera lens 110. Similarly, the brother's MPS 103 comprises a microphone 111 and a video camera lens 112. The home MPS 101 may be controlled via a remote control 113. Similarly, the brother's MPS 103 may be controlled via a remote control 114. The remote controls may communicate with the MPS's via infrared or RF signals, in accordance with various embodiments of the present invention.

In accordance with various embodiments of the present invention, a MPS may comprise a set-top-box (STB), a PC, or a TV with a media management system (MMS). A MMS is also known herein as a media exchange software (MES) platform.

A MMS comprises a software platform operating on at least one processor to provide certain functionality including user interface functionality, distributed storage functionality, and networking functionality. For example, a MMS may provide control of media peripheral devices, status monitoring of media peripheral devices, and inter-home MPS routing selection, in accordance with an embodiment of the present invention.

The $3^{rd}$ party commercial broadcast provider 106 stores the first media content 115 (e.g., commercial broadcast media content). The first media content 115 may comprise commercial broadcast television programs such as, for example, movies, sporting event, weekly programs, etc. In accordance with an embodiment of the present invention, the $3^{rd}$ party commercial broadcast provider 106 may push the first media content 115 to the home MPS 101 and the brother's MPS 103 via the Internet-based media exchange network infrastructure 105.

The second media content 116 (e.g., the real-time user-captured media content) may be generated by the home MPS 101 and the brother's MPS 103, in accordance with an embodiment of the present invention. The second media content 116 may comprise real-time video and/or audio captured by the home MPS 101 using the video camera lens 110 and/or the microphone 109. Also, the second media content 116 may comprise real-time video and/or audio captured by the brother's MPS 103 using the video camera lens 112 and/or the microphone 111. The home MPS 101 may push the second media content 116, originating at the home MPS 101, to the brother's MPS 103 via the Internet-based media exchange network 105, in accordance with an embodiment of the present invention. Also, the brother's MPS 103 may push the second media content 116, originating at the brother's MPS 103, to the home MPS 101 via the Internet-based media exchange network 105, in accordance with an embodiment of the present invention.

The Internet-based media exchange network infrastructure 105 may comprise, for example, cable infrastructure, satellite network infrastructure, DSL infrastructure, Internet infrastructure, intranet infrastructure, a wired infrastructure, and/or a wireless infrastructure providing wide area network (WAN) capability. Each of the entities within the media exchange network infrastructure 105 such as, for example, servers, media processing systems, media peripheral, etc., may be identified using a network protocol address such as, for example, an Internet protocol (IP) address, a media access control (MAC) address, an electronic serial number (ESN), etc.

Figure 1B:
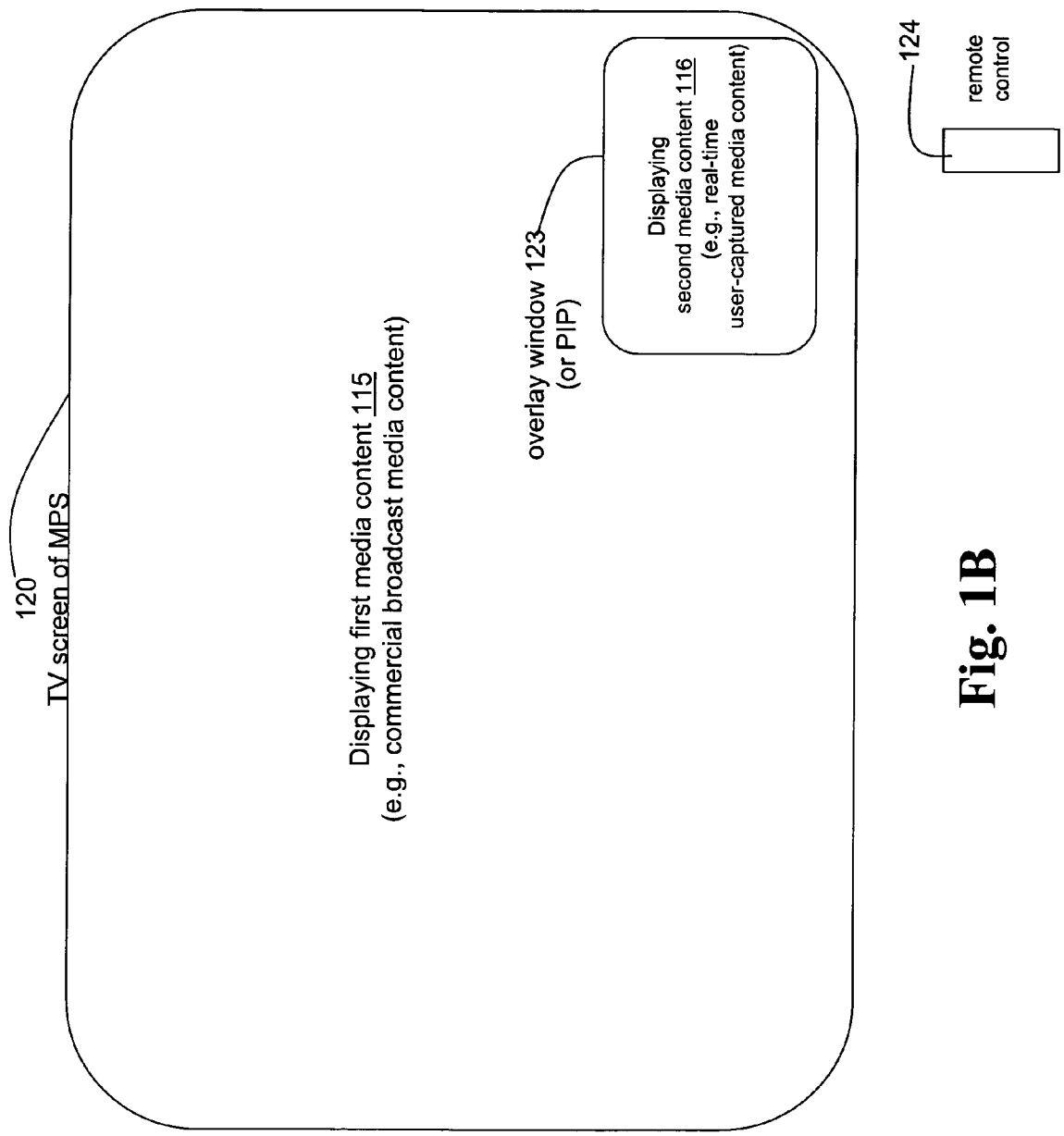
FIG. 1B is a diagram illustrating a TV screen of a media processing system, in the media exchange network of FIG. 1A, supporting the concurrent consumption the first media content and the second media content of FIG. 1A, in accordance with various aspects of the present invention.

FIG. 1B is a diagram illustrating a TV screen 120 of a media processing system (e.g., 101 or 103), in the media exchange network 100 of FIG. 1A, supporting the concurrent consumption of the first media content 115 (e.g., the commercial broadcast media content) and the second media content 116 (e.g., the real-time user-captured media content) of FIG. 1A, in accordance with various aspects of the present invention. The first media content 115 may be displayed on the majority of the TV screen 120, and the second media content 116 may be displayed in an overlay window 123 in a corner of the TV screen 120. In accordance with an embodiment of the present invention, the displayed first media content 115 may comprise commercial broadcast media content, and the displayed second media content 116 may comprise real-time user-captured media content.

The displaying of the overlay window 123 is optional and may be controlled via the remote control 124, in accordance with an embodiment of the present invention (for the home MPS 101, the remote control 124 is the remote control 113; for the brother's MPS 103, the remote control 124 is the remote control 114).

Figure 2:
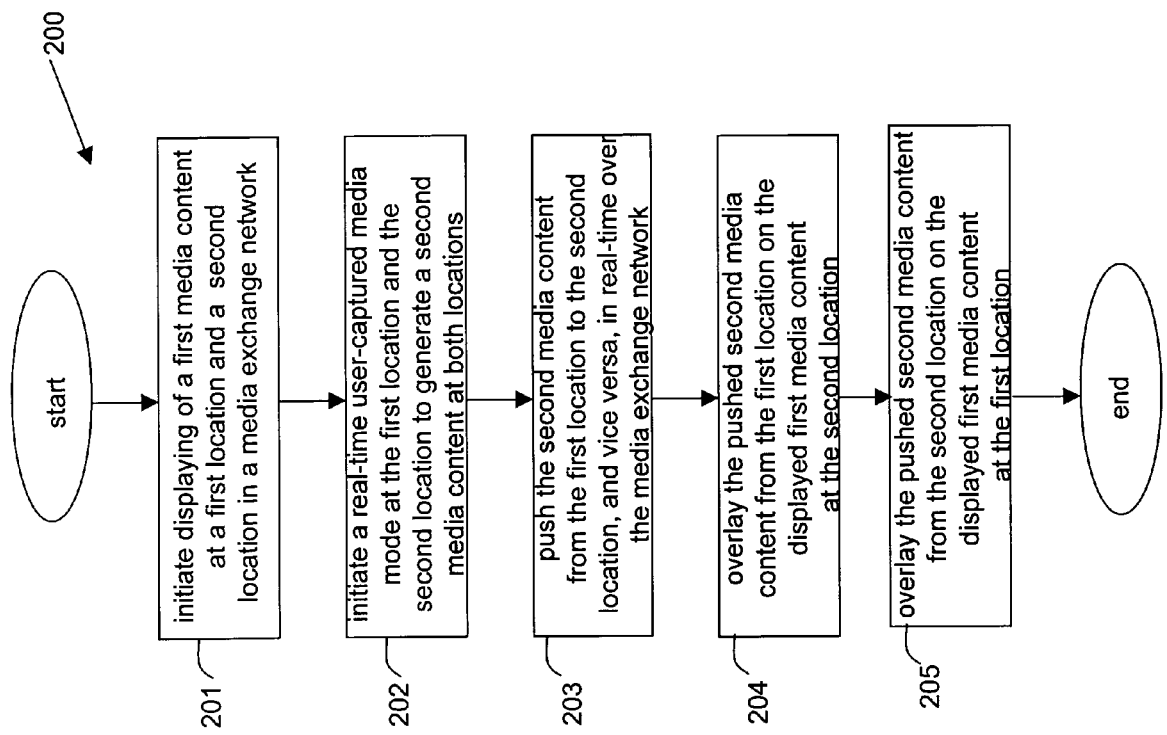
FIG. 2 is a flowchart illustrating an embodiment of a method to support the concurrent consumption of the first media content and the second media content of FIG. 1A in the media exchange network of FIG. 1A, in accordance with various aspects of the present invention.

FIG. 2 is a flowchart illustrating an embodiment of a method 200 to support the concurrent consumption of the first media content 115 and the second media content 116 of FIG. 1A in the media exchange network 100 of FIG. 1A, in accordance with various aspects of the present invention. In step 201, displaying of the first media content at a first location and a second location in a media exchange network is initiated. In step 202, a real-time user-captured media mode is initiated at the first location and the second location to generate second media content at both locations.

In step 203, the second media content from the first location is pushed to the second location, in real time, over the media exchange network. Also, the second media content from the second location is pushed to the first location, in real time, over the media exchange network. In step 204, the second media content from the first location is overlayed onto the displayed first media content at the second location. In step 205, the second media content from the second location is overlayed onto the displayed first media content at the first location.

As an example, a user at the user's home 102 may use his remote control 113 in conjunction with his home MPS 101 to initiate displaying of a football game from the $3^{rd}$ party commercial broadcast provider 106. Similarly, the user's brother at the brother's home 104 may use his remote control 114 in conjunction with the brother's MPS 103 to initiate displaying of the same football game from the $3^{rd}$ party commercial broadcast provider 106.

The user at user's home 102 may then initiate a real-time user-captured media mode in his home MPS 101 using his remote control 113. The mode activates the microphone 109 and the video camera lens 110 to capture the user's image and voice as he sits in a chair at the user's home 102 viewing the football game on a TV screen 120 of his home MPS 101. The user may then use his remote control 113 to command that the real-time user-captured media be pushed to the brother's MPS 103 via the Internet-based media exchange network infrastructure 105.

As a result, an overlay window 123 pops up on the TV screen 120 of the brother's MPS 103 and the brother, who is also viewing the football game, is able to see and hear the user, at user's home 102, comment on the football game. In a similar manner, the brother at brother's home 104 uses his remote control 114 and MPS 103 to push real-time video and audio of himself to the user's home 102. As a result, an overlay window 123 pops up on the TV screen 120 of the home MPS 101 and the user is able to see and hear his brother, at the brother's home 104, comment on the football game as well. The media exchange network 100 provides a real-time shared experience between the user at user's home 102 and the brother at brother's home 104. The MPS's 101 and 103 are able to process both the commercial broadcast media content (i.e., the football game) and the real-time user-captured media content (i.e., the user and the brother) concurrently.

In accordance with various embodiments of the present invention, the first media content 115 may comprise real-time commercial broadcast media content generated by a $3^{rd}$ party commercial broadcast provider, non-real-time (i.e., stored) commercial broadcast media content, other $3^{rd}$ party media content generated by some other $3^{rd}$ party media provider (real-time or non-real-time), and personal media content generated by a user or a friend or family member, for example (real-time or non-real-time).

In accordance with various embodiments of the present invention, the second media content 116 may comprise audio only, video only, text only, or any combination of audio, video, and text.

In accordance with various embodiments of the present invention, the media exchange network 100 may comprise a plurality of users exchanging real-time user-captured media content.

In accordance with an alternative embodiment of the present invention, the second media content 116 may be pushed between several parties (e.g., the user and the brother) without the first media content being pushed. As a result, the second media content 116 may be displayed on the full TV screen 120.

In accordance with another alternative embodiment of the present invention, a remote control may be used to toggle the first media content 115 from the main portion of the TV screen 120 to the overlay window 123, and the second media content 116 from the overlay window 123 to the main portion of the TV screen 120 and vice versa.

In accordance with a further alternative embodiment of the present invention, the microphone 109 and/or the video camera lens 110 may be integrated into the remote control 113, instead of the MPS 101. Similarly, the microphone 111 and/or the video camera lens 112 may be integrated into the remote control 114, instead of the MPS 103.

In accordance with still a further embodiment of the present invention, the overlay window 123 may instead comprise a PIP (picture-in-picture) display presentation.

As another alternative embodiment of the present invention, a MPS may comprise a speech recognition capability allowing a user to talk into a microphone to capture audio, convert the captured audio to text, and push the text to another MPS on the media exchange network. As another alternative, text may be entered into and captured by a MPS using a keyboard that interfaces to the MPS.

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a TV channel guide look-and-feel user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
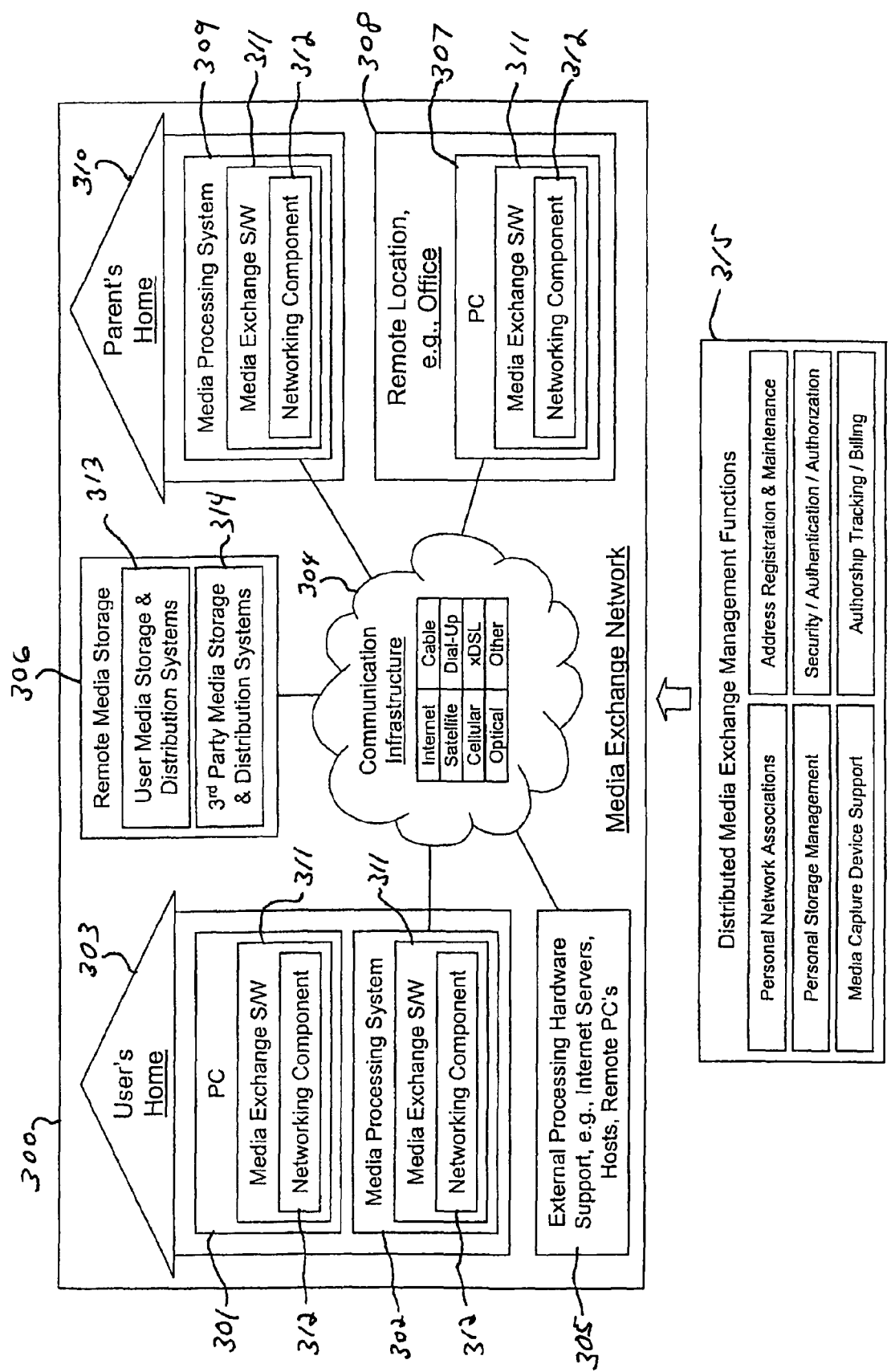
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
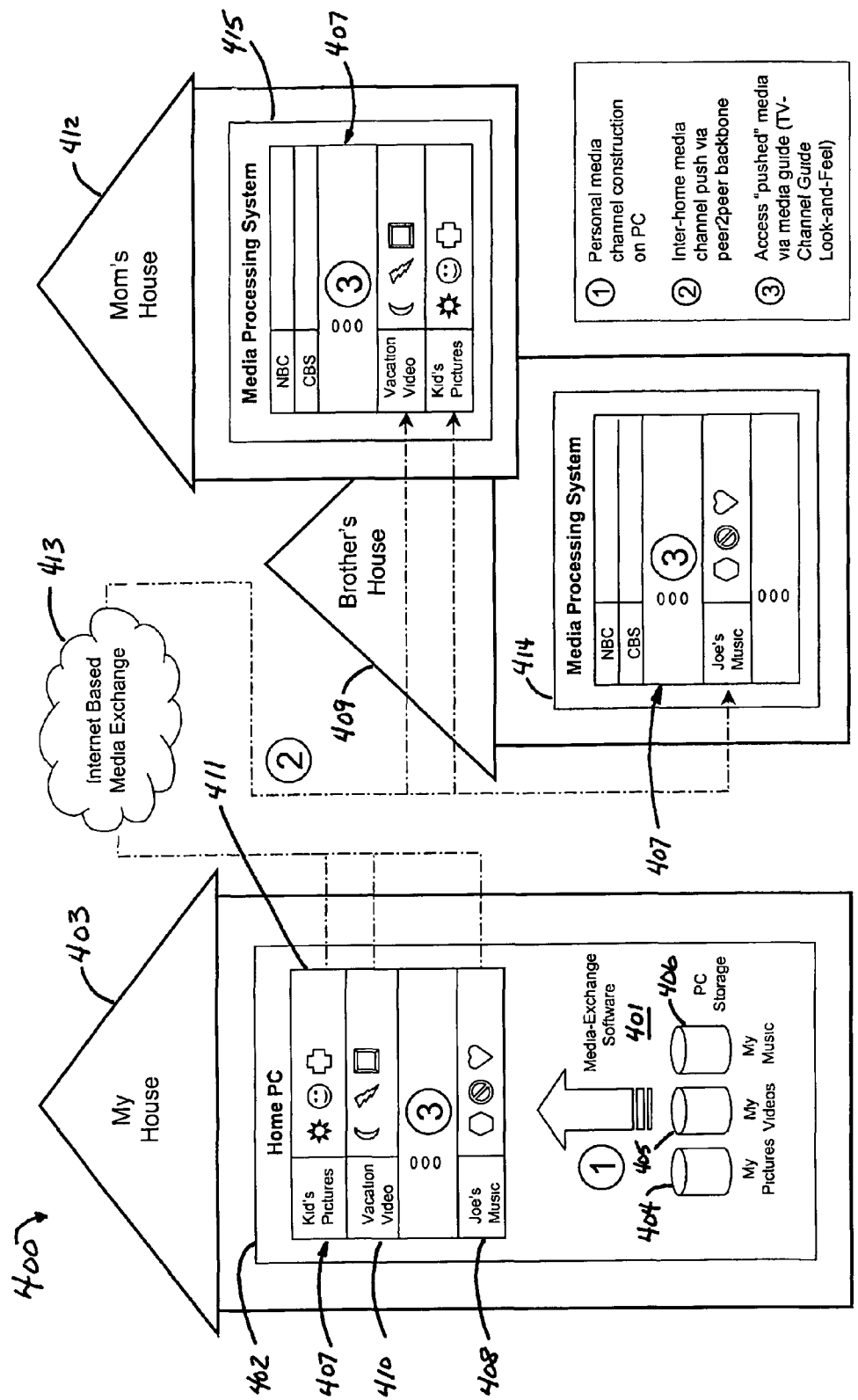
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a TV channel guide look-and-feel user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a TV channel guide look-and-feel user interface 407.

In step 3, brother and/or Mom access the pushed media channels via their respective media processing systems (MPS's) 414 and 415 using their respective MPS TV screens and remote controls.

Figure 5:
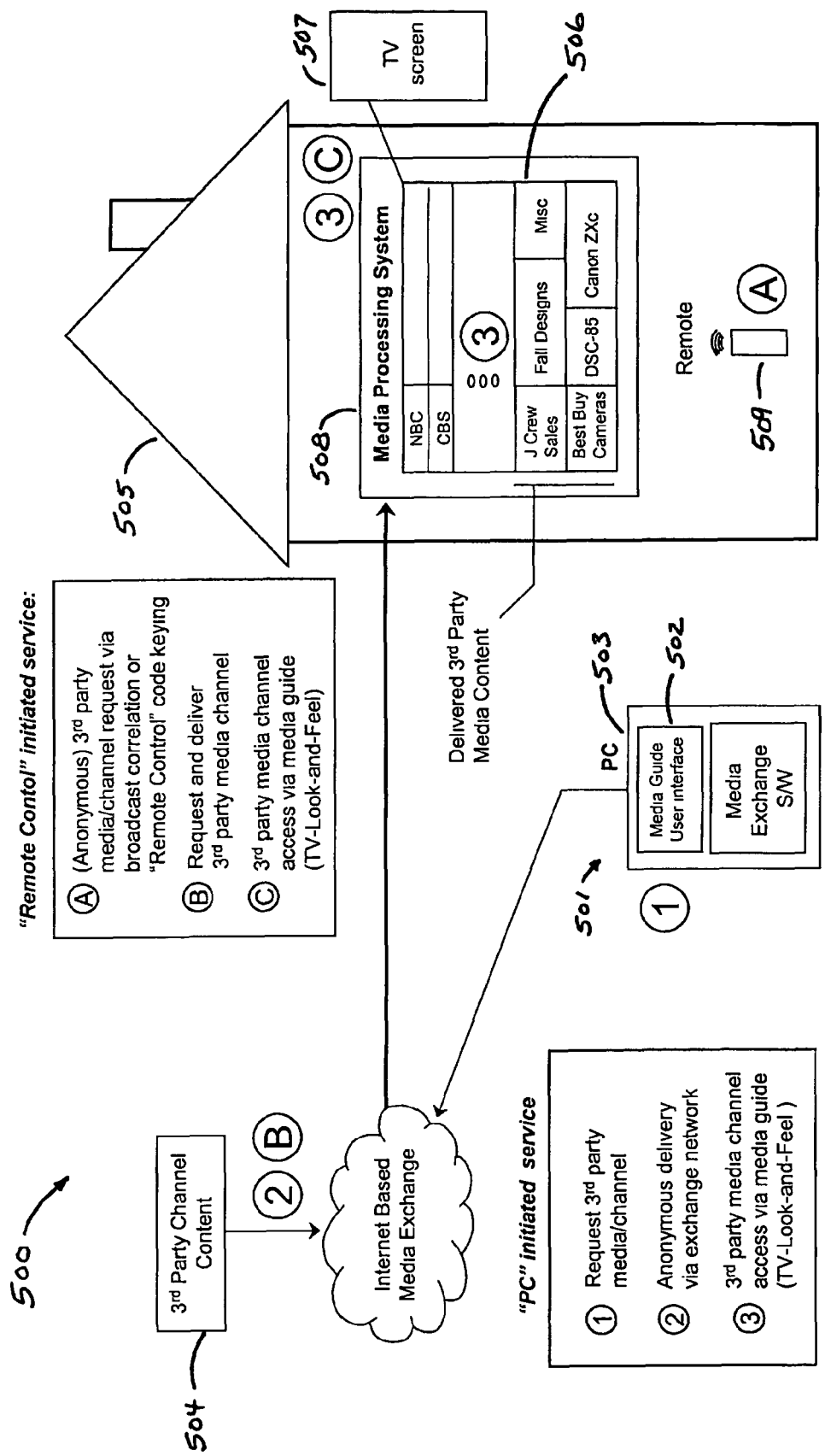
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a TV channel guide look-and-feel user interface 502 on a PC 503. In step 2, an anonymous delivery of the requested third-party channel 504 is made to a second party 505 via the internet-based media exchange network 500. In step 3, the second party 505 accesses the third-party channel 504 using a TV channel guide look-and-feel user interface 506 on a TV screen 507 that is integrated into an MPS 508.

Similarly, in step A, an MPS-initiated third-party request is made by a second party 505 via an internet-based media exchange network 500 using a TV channel guide look-and-feel user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a TV channel guide look-and-feel user interface 502 on a PC 503.

Figure 6:
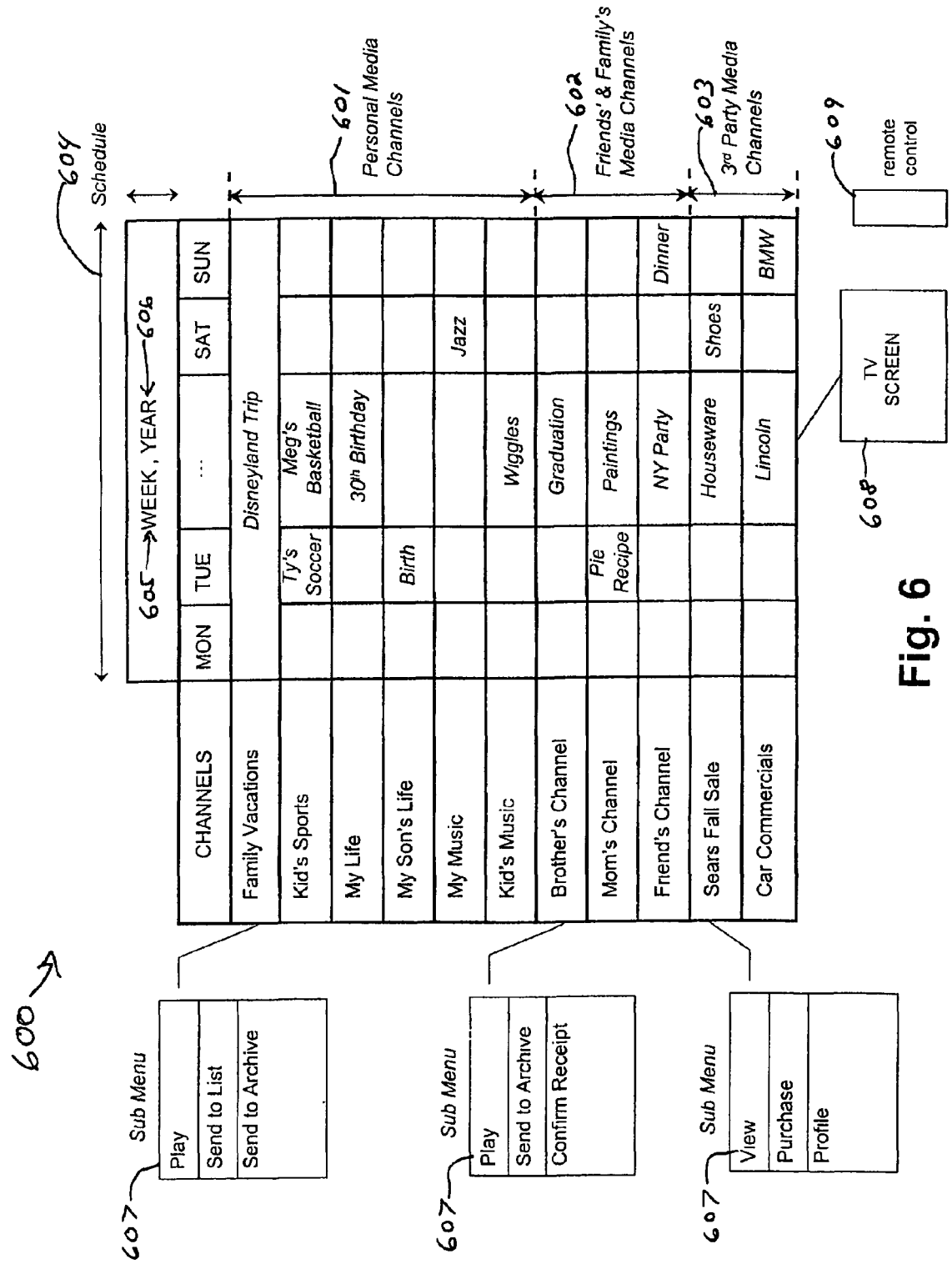
FIG. 6 is an exemplary illustration of a TV guide channel user interface in accordance with an embodiment of the present invention.

FIG. 6 illustrates a TV channel guide user interface 600 in accordance with an embodiment of the present invention. The TV channel guide user interface 600 may be displayed on a TV screen 608 and controlled by a remote control device 609. Also, the TV channel guide user interface 600 may be displayed on a PC monitor and controlled by a keyboard or mouse.

The TV channel guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
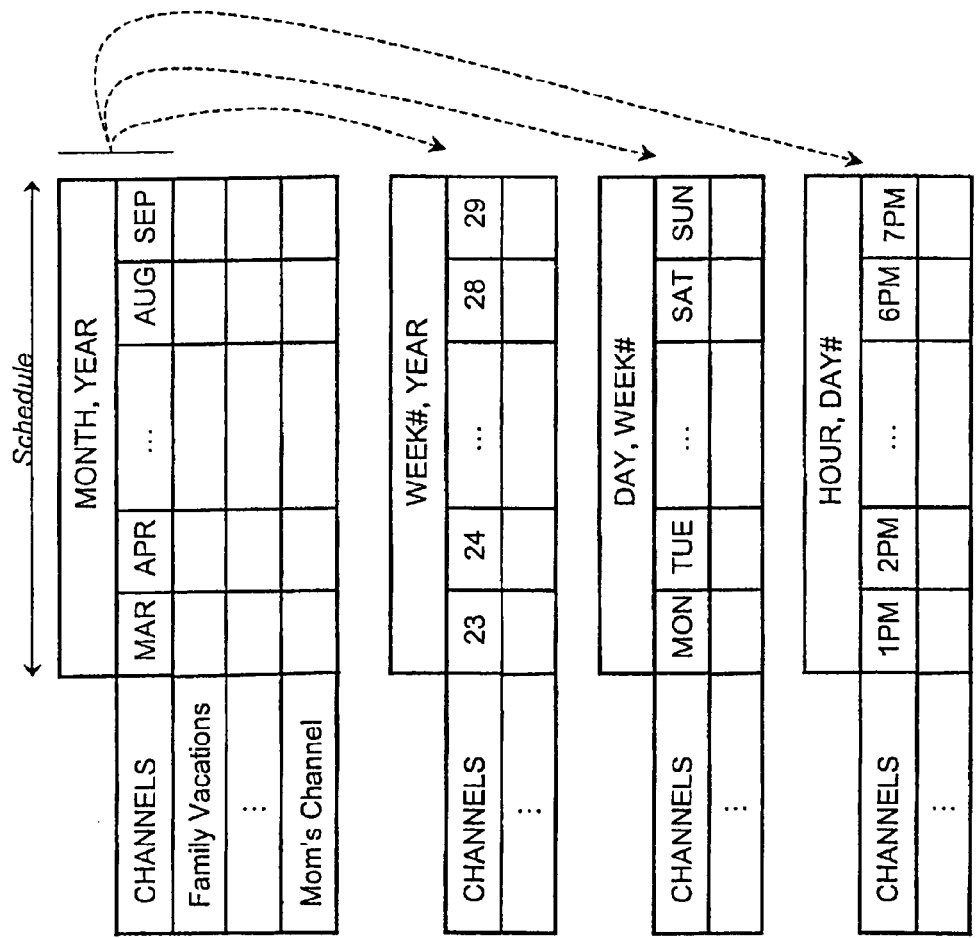
FIG. 7 is an exemplary illustration of several instantiations of a TV guide channel user interface of FIG. 4 in accordance with an embodiment of the present invention.

FIG. 7 illustrates possible multiple instantiations of a TV channel guide user interface 700 in accordance with an embodiment of the present invention. The TV channel guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The TV channel guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
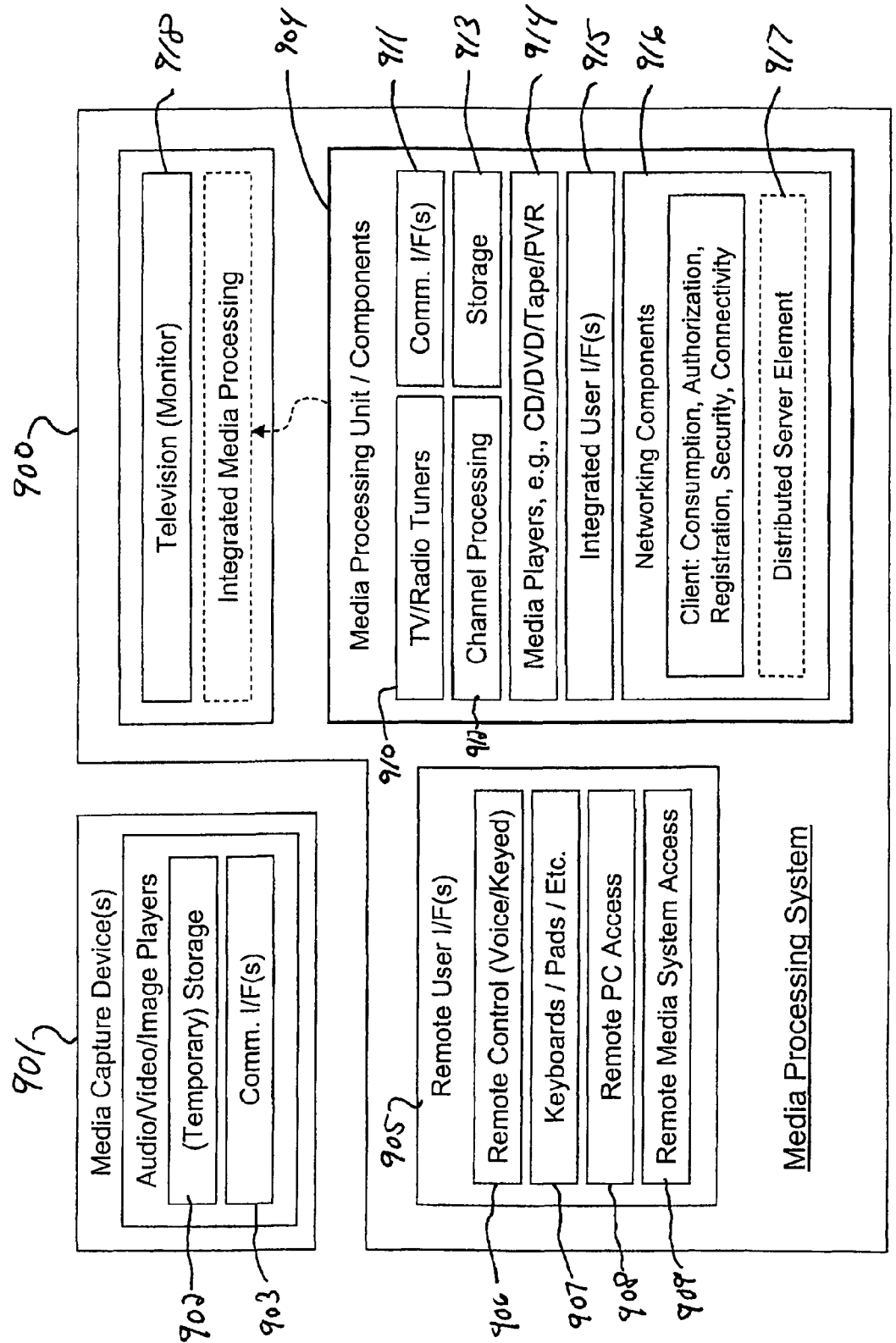
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

Figure 9B:
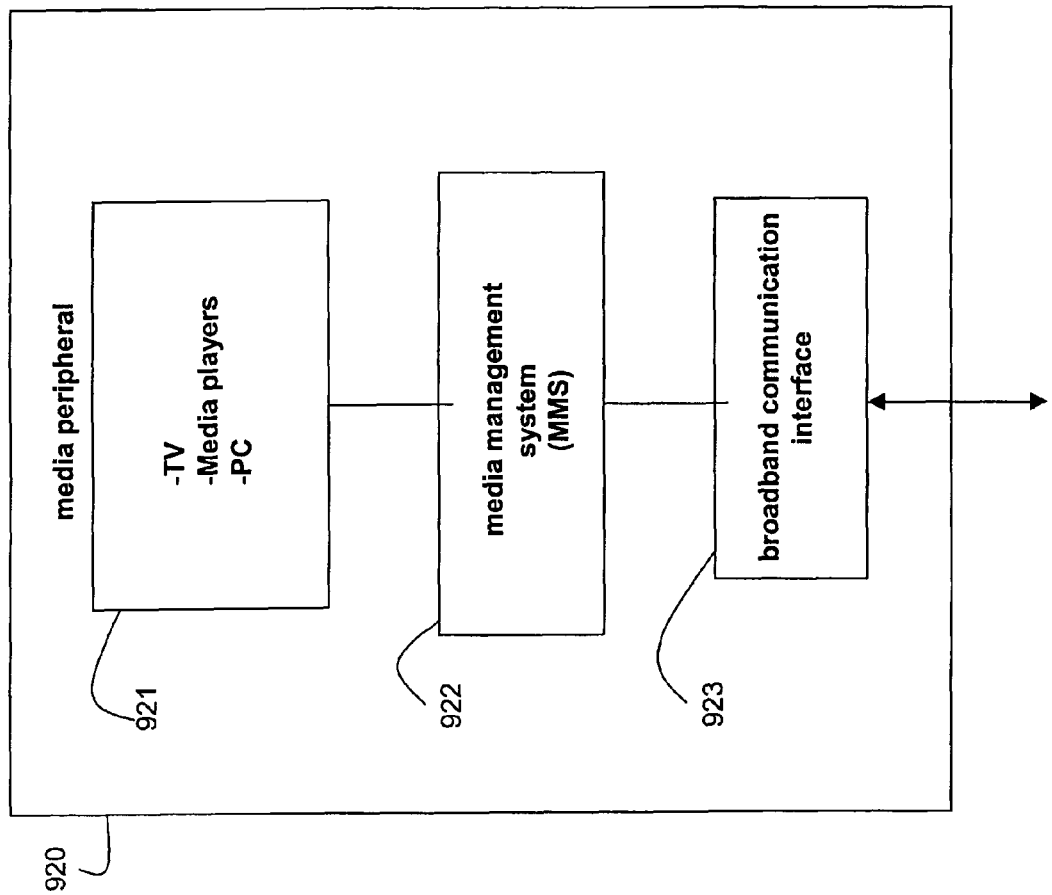
FIG. 9B illustrates an alternative embodiment of a media processing system (MPS) in accordance with various aspects of the present invention.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite head end.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
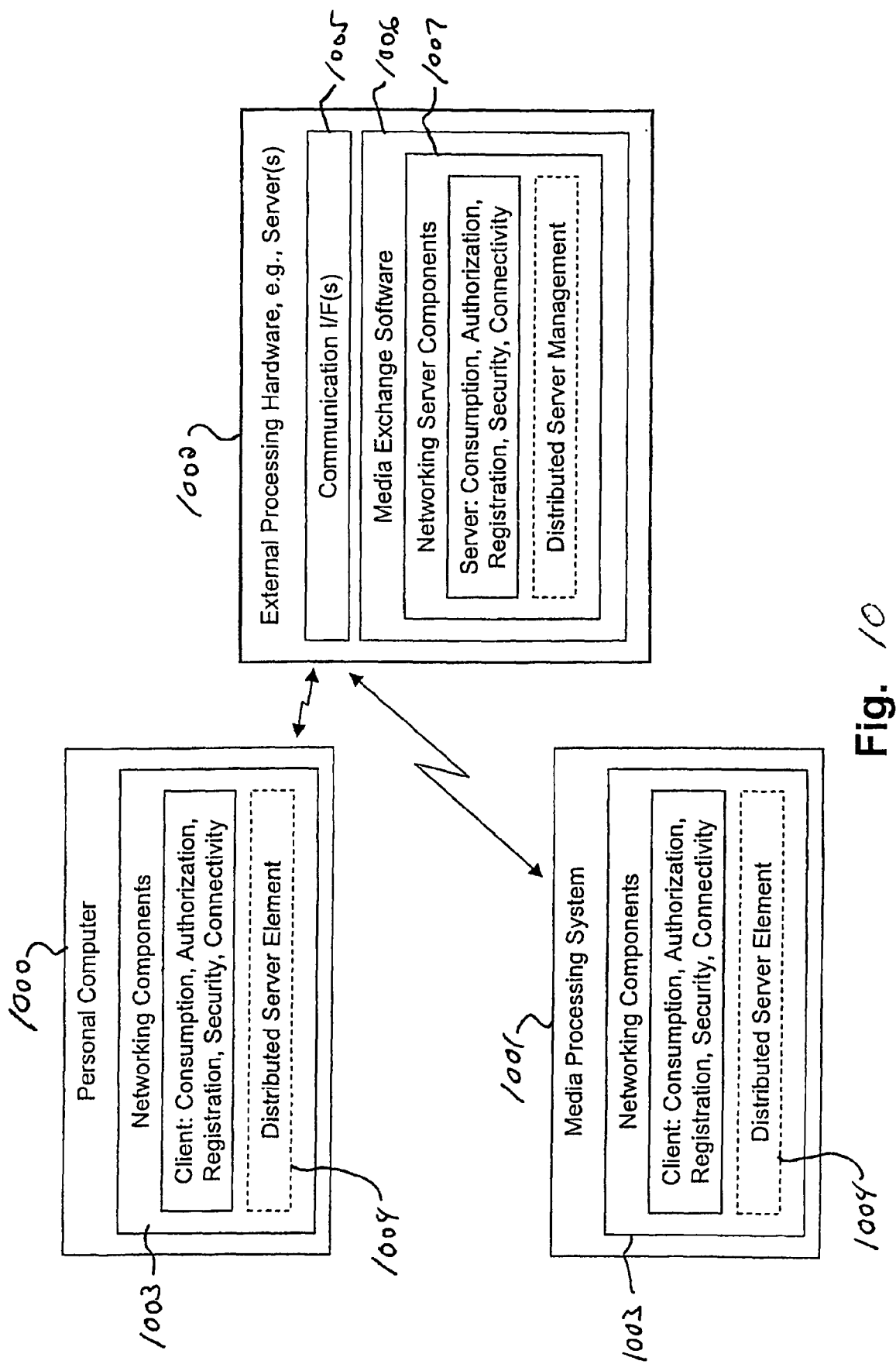
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
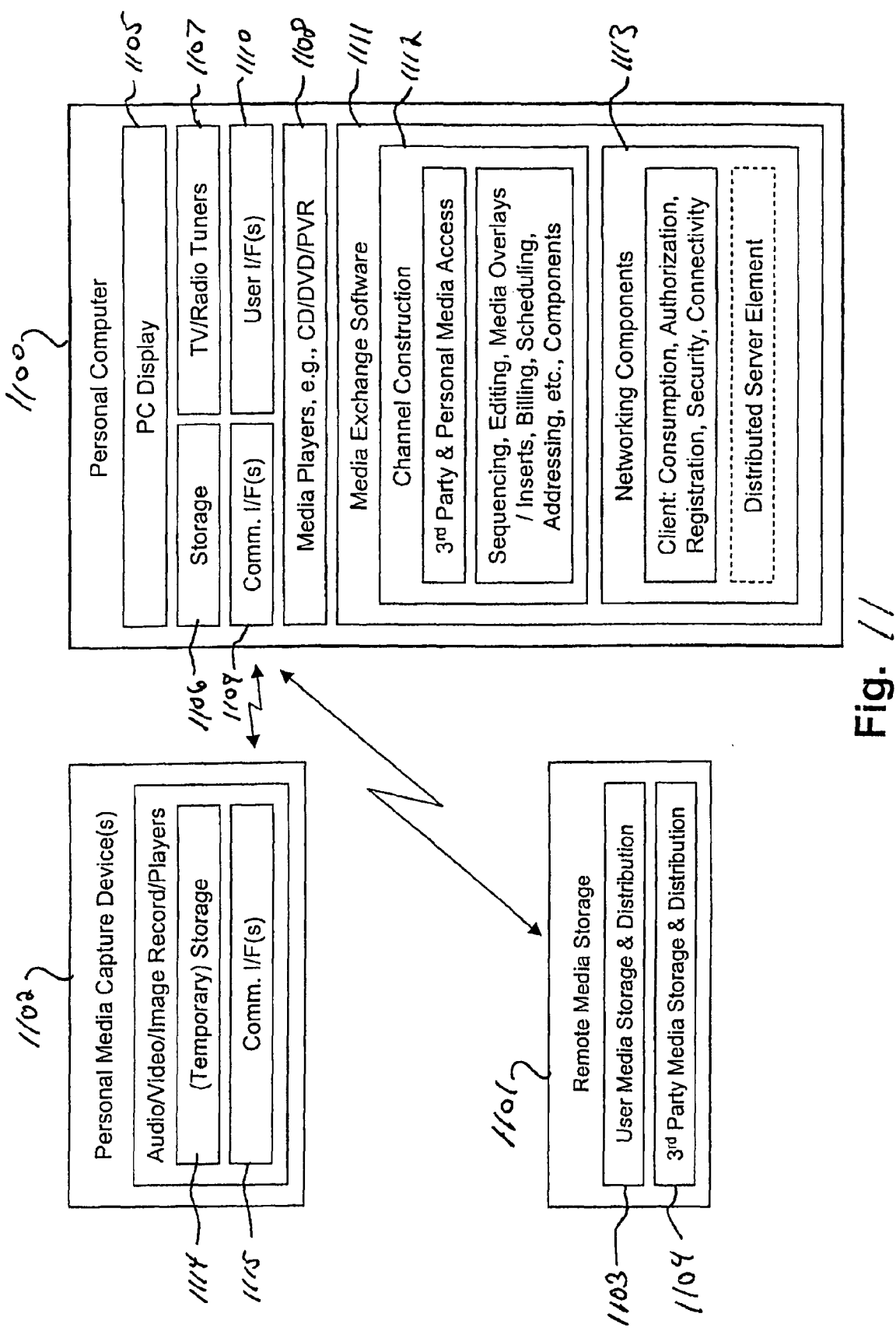
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

As described above, a system and method provide the ability to support the concurrent consumption of a first media content and a second media content on a media exchange network.

Aspects of the present invention may be found in a media exchange network supporting concurrent consumption of media content from multiple sources. Such a media exchange network may comprise a first media processing system at a first location, a second media processing system at a second location, and at least one server for storing and distributing broadcast media content. The media exchange network may also comprise a communication network infrastructure communicatively coupling the first media processing system, the second media processing system, and the at least one server. The first and second media processing systems may concurrently consume the broadcast media content from the at least one server, and the first media processing system may provide a first media content to the second media processing system.

The broadcast media content in an embodiment of the present invention may comprise at least one of audio, a still image, video, and data, and the at least one server may comprise at least one of a 3rd party broadcast media provider, a 3rd party service provider, a media exchange server, and a broadband head end. The first media content may comprise at least one of audio, a still image, video, and data, and the first media content may be real-time video. The communication network of such an embodiment may comprise at least one of a cable infrastructure, a satellite network infrastructure, a digital subscriber line (DSL) infrastructure, an Internet infrastructure, an intranet infrastructure, a wired infrastructure, and a wireless infrastructure, and the communication network may be the Internet. In an embodiment of the present invention, the at least one server may be the first media processing system.

In an embodiment in accordance with the present invention, the first media processing system may comprise one of at least a set-top-box, a personal computer, and a television; a media management system; and a communications interface, where the communication interface may be a packet network interface. The first media processing system may also comprise at least one media peripheral. The at least one media peripheral may comprise at least one of a digital camera, a digital camcorder, a television, a personal computer, a CD player, a home juke-box, a mobile multi-media gateway, a multi-media personal digital assistant, a DVD player, a tape player, and a MP3 player. In another embodiment of the present invention, the first media processing system may comprise a media guide interface for manipulating and consuming media content, and a storage area for storing media content. The first media processing system may be capable of simultaneously consuming media content from at least two sources.

In yet another embodiment of the present invention, the second media processing system may comprise one of at least a set-top-box, a personal computer, and a television; a media management system; and a communications interface, where the communication interface may be a packet network interface. The second media processing system may comprise at least one media peripheral. The at least one media peripheral may comprise at least one of a digital camera, a digital camcorder, a television, a personal computer, a CD player, a home juke-box, a mobile multi-media gateway, a multi-media personal digital assistant, a DVD player, a tape player, and a MP3 player. In an embodiment of the present invention, the second media processing system may also comprise a media guide interface for manipulating and consuming media content, and a storage area for storing media content. The second media processing system may be capable of simultaneously consuming media content from at least two sources, and may provide a second media content to the first media processing system, where the second media content comprises at least one of audio, a still image, video, and data. The second media content may be real-time video in an embodiment in accordance with the present invention.

Additional aspects of the present invention may be observed in a method of operating a media exchange network supporting concurrent consumption of media content from multiple sources. One embodiment in accordance with the present invention may comprise transporting a first media content from a first user at a first location to a second user at a second location, and conveying broadcast media content from a server to the first user at the first location and to a second user at a second location concurrent with the transporting. An embodiment may also comprise communicating a second media content from the second user at the second location to the first user at the first location concurrent with the transporting. At least one of the transporting, conveying, and communicating may be performed using a packet network.

Yet a further aspect of the present invention may be seen in a method of operating a media processing system supporting concurrent consumption of media content from multiple sources in a media exchange network. Such a method may comprise selecting broadcast media content based upon input from a first user at a first location, and identifying at a first location a second user at a second location based on input from the first user at the first location. The method may further comprise accepting at the first location media content from the second user at the second location, and consuming concurrently at the first location the broadcast media content and the media content from the second location. At least one of the selecting and identifying may be performed using a media guide interface, and the broadcast media content may comprise at least one of audio, a still image, video, and data. In an embodiment of the present invention, the accepting may be performed using a communication network, and the communication network may comprise at least one of a cable infrastructure, a satellite network infrastructure, a digital subscriber line (DSL) infrastructure, an Internet infrastructure, an intranet infrastructure, a wired infrastructure, and a wireless infrastructure. The communication network may be the Internet.

The consuming may comprise at least one of playing digitized audio, displaying a still image, displaying video, and displaying data in an embodiment in accordance with the present invention. The broadcast media content may be stored on a server, and the server may comprise at least one of at least one of a 3rd party broadcast media provider, a 3rd party service provider, a media exchange server, and a broadband head end. In addition, a method in accordance with the present invention may comprise providing to the second user at the second location media content from the first location.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A system supporting concurrent consumption of media from multiple sources, the system comprising:
at least one processor operably coupled to a first television in a first home and to a first storage in the first home that stores a first media, the first storage having a first network protocol address, the at least one processor communicatively coupled, via a communication network, to a second television in a second home and a second storage in the second home, the second storage having a second network protocol address, the at least one processor communicatively coupled, via the communication network, to at least one server for storing and distributing 3rd party media, the at least one processor operable to, at least:
communicate with first software that maintains a user defined association of the first and second network protocol addresses, that receives a request that identifies one of the associated first and second network protocol addresses and responds by identifying the other of the associated first and second network protocol addresses to support delivery via the communication network of the 3rd party media from the at least one server, and the first media from the first storage, to the second home, and the 3rd party media from the at least one server, to the first home, for concurrent consumption of the 3rd party media by the first television, and the 3rd party media and the first media by the second television; and
communicate with second software configured to enable a user at the first home to construct, at the first home, at least one user defined media channel, the second software also configured to enable closed and secure communication of the at least one user defined media channel to others within a user defined group that are at separate and distinct locations from the first home, in a peer-to-peer manner, from the first home.

2. The system of claim 1 wherein the first media comprises one or more of audio, a still image, video, and/or data.

3. The system of claim 2, wherein the first media is real-time video.

4. The system of claim 1, wherein the 3rd party media comprises one or more of audio, a still image, video, and/or data.

5. The system of claim 1, wherein the first and second network protocol addresses are one of an Internet protocol (IP) address, a media access control (MAC) address, or an electronic serial number (ESN).

6. The system of claim 1, wherein the at least one server comprises one or more of a 3rd party media provider, a 3rd party service provider, and/or a broadband head end.

7. The system of claim 1, wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

8. The system of claim 7, wherein the communication network is the Internet.

9. The system of claim 1, wherein the consuming comprises one or more of playing digitized audio, displaying a still image, displaying video, and/or displaying data.

10. The system of claim 1, wherein the at least one processor is operably coupled to at least one first media peripheral communicatively coupled to the first storage.

11. The system of claim 10, wherein the at least one first media peripheral comprises one or more of a digital camera, a digital camcorder, a television, a personal computer, a CD player, a home juke-box, a mobile multi-media gateway, a multi-media personal digital assistant, a DVD player, a tape player, and/or a MP3 player.

12. The system of claim 1, wherein the at least one processor is operably coupled to at least one second media peripheral communicatively coupled to the second storage, and communicates with server software supporting delivery of the second media from the second storage to the first home for concurrent consumption of the 3rd party media and the second media by the first television display.

13. The system of claim 12, wherein the at least one second media peripheral comprises one or more of a digital camera, a digital camcorder, a television, a personal computer, a CD player, a home juke-box, a mobile multi-media gateway, a multi-media personal digital assistant, a DVD player, a tape player, and/or a MP3 player.

14. The system of claim 1, wherein the at least one processor is operably coupled to a media guide interface for displaying media availability.

15. A system supporting concurrent consumption of media from multiple sources, the system comprising:
at least one processor operably coupled to a first storage in a first home that stores a first media, the first storage having a first protocol address, the at least one processor communicatively coupled, via a communication network, to a second television in a second home, the second storage having a second protocol address, the at least one processor communicatively coupled, via the communication network, to at least one server for storing and distributing 3rd party media, the at least one processor operably coupled to set to box circuitry in the first home, the set to box circuitry communicatively coupled to deliver, via the communication network, the first media from the first storage to the second television concurrent with consumption, at the first home, of at least the 3rd party media, the at least one processor operable to, at least:

communicate with first software that maintains a user defined association of the first and second protocol addresses, that receives a request that identifies one of the associated first and second protocol addresses and responds by identifying the other of the associated first and second protocol addresses to support delivery via the communication network of the 3rd party media from the at least one server and the first media from the first storage, to the second television for concurrent consumption of the 3rd party media and the first media; and communicate with second software configured to enable a user at the first home to construct, at the first home, at least one user defined media channel, the second software also configured to enable closed and secure communication of the at least one user defined media channel to others within a user defined group that are at separate and distinct locations from the first home, in a peer-to-peer manner, from the first home.

16. The system of claim 15, wherein the first media comprises one or more of audio, a still image, video, and/or data.

17. The system of claim 15, wherein the first media is real-time video.

18. The system of claim 15, wherein the 3rd party media comprises one or more of audio, a still image, video, and/or data.

19. The system of claim 15, wherein the first and second protocol addresses are one of an Internet protocol (IP) address, a media access control (MAC) address, or an electronic serial number (ESN).

20. The system of claim 15, wherein the at least one server comprises one or more of a 3rd party media provider, a 3rd party service provider, and/or a broadband head end.

21. The system of claim 15, wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

22. The system of claim 21, wherein the communication network is the Internet.

23. The system of claim 15, wherein the at least one processor is operably coupled to at least one first media peripheral communicatively coupled to the first storage.

24. The system of claim 23, wherein the at least one first media peripheral comprises one or more of a digital camera, a digital camcorder, a television, a personal computer, a CD player, a home juke-box, a mobile multi-media gateway, a multi-media personal digital assistant, a DVD player, a tape player, and/or a MP3 player.

25. A system supporting concurrent consumption of media from multiple sources, the system comprising:

at least one processor operably coupled to a first storage in a first home that stores a first media, the at least one processor communicatively coupled, via a communication network, to a second television in a second home, the at least one processor communicatively coupled, via the communication network, to at least one server for storing and distributing 3rd party media, the at least one processor operably coupled to set to box circuitry in the second home, the set to box circuitry communicatively coupled to receive the first media from the first storage and the 3rd party media from the at least one server, for concurrent consumption by the second television, the at least one processor operable to, at least:

communicate with first software that coordinates delivery via the communication network of the first media from the first storage and the 3rd party media from the at least one server to the set top box circuitry; and communicate with second software configured to enable a user at the first home to construct, at the first home, at least one user defined media channel, the second software also configured to enable closed and secure communication of the at least one user defined media channel to others within a user defined group that are at separate and distinct locations from the first home, in a peer-to-peer manner, from the first home.

26. The system of claim 25, wherein the first media and the 3rd party media comprise one or more of audio, a still image, video, and/or data.

27. The system of claim 25, wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

28. The system of claim 25, wherein the at least one processor is operably coupled to at least one media peripheral communicatively coupled to the first storage, the at least one media peripheral comprising one or more of a digital camera, a digital camcorder, a television, a personal computer, a CD player, a home juke-box, a mobile multi-media gateway, a multi-media personal digital assistant, a DVD player, a tape player, and/or a MP3 player.

29. The system of claim 25, wherein the at least one processor is operably coupled to a media guide interface for displaying and coordinating media availability.

30. A system supporting concurrent consumption of media from multiple sources, the system comprising:

at least one processor arranged for operably coupling to set top box circuitry, in a second home, the set top box circuitry communicatively coupled to receive first media from a first storage located in a first home and to receive 3rd party media from at least one server, for concurrent consumption by a second television in the second home;

the at least one processor communicating with first software that coordinates delivery via a communication network of the first media from the first storage and the 3rd party media from the at least one server to the set top box circuitry; and the at least one processor communicating with second software configured to enable a user at the first home to construct, at the first home, at least one user defined media channel, the second software also configured to enable closed and secure communication of the at least one user defined media channel to others within a user defined group that are at separate and distinct locations from the first home, in a peer-to-peer manner, from the first home.

31. The system of claim 30, wherein the first media and the 3rd party media comprise one or more of audio, a still image, video, and/or data.

32. The system of claim 30, wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

33. The system of claim 30, wherein the at least one processor is operably coupled to at least one media peripheral communicatively coupled to the first storage, the at least one media peripheral comprising one or more of a digital camera, a digital camcorder, a television, a personal computer, a CD player, a home juke-box, a mobile multi-media gateway, a multi-media personal digital assistant, a DVD player, a tape player, and/or a MP3 player.

34. The system of claim 30, wherein the at least one processor is operably coupled to a media guide interface for displaying and coordinating media availability.

35. A system supporting concurrent consumption of media from multiple sources, the system comprising:
- at least one processor arranged for operably coupling to at least one server for storing and distributing 3rd party media;
- the at least one processor communicating with first software that maintains a user defined association of a first network protocol address of a first storage in a first home and second network protocol address of a second storage in a second home, the first software configured to receive a request that identifies one of the associated first and second network protocol addresses and respond by identifying the other of the associated first and second network protocol addresses to support delivery via a communication network of the 3rd party media from the at least one server, and the first media from the first storage, to the second home, and the 3rd party media from the at least one server to the first home, for concurrent consumption of the 3rd party media by a first television at the first home and the 3rd party media and the first media by a second television at the second home; and
- the at least one processor communicating with second software configured to enable a user at the first home to construct, at the first home, at least one user defined media channel, the second software also configured to enable closed and secure communication of the at least one user defined media channel to others within a user defined group that are at separate and distinct locations from the first home, in a peer-to-peer manner, from the first home.

36. The system of claim 35, wherein the first media comprises one or more of audio, a still image, video, and/or data.

37. The system of claim 36, wherein the first media is real-time video.

38. The system of claim 35, wherein the 3rd party media comprises one or more of audio, a still image, video, and/or data.

39. The system of claim 35, wherein the first and second network protocol addresses are one of an Internet protocol (IP) address, a media access control (MAC) address, or an electronic serial number (ESN).

40. The system of claim 35, wherein the at least one server comprises one or more of a 3rd party media provider, a 3rd party service provider, and/or a broadband head end.

41. The system of claim 35, wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

42. The system of claim 41, wherein the communication network is the Internet.

43. The system of claim 35, wherein the consumption comprises one or more of playing digitized audio, displaying a still image, displaying video, and/or displaying data.

44. The system of claim 35, wherein the at least one processor is operably coupled to at least one first media peripheral communicatively coupled to the first storage.

45. The system of claim 44, wherein the at least one first media peripheral comprises one or more of a digital camera, a digital camcorder, a television, a personal computer, a CD player, a home juke-box, a mobile multi-media gateway, a multi-media personal digital assistant, a DVD player, a tape player, and/or a MP3 player.

46. The system of claim 35, wherein the at least one processor is operably coupled to at least one second media peripheral communicatively coupled to the second storage, and the at least one processor communicates with the software supporting delivery of the second media from the second storage to the first home for concurrent consumption of the 3rd party media and the second media.

47. The system of claim 46, wherein the at least one second media peripheral comprises one or more of a digital camera, a digital camcorder, a television, a personal computer, a CD player, a home juke-box, a mobile multi-media gateway, a multi-media personal digital assistant, a DVD player, a tape player, and/or a MP3 player.

48. The system of claim 35 comprising a media guide interface for displaying media availability.

* * * * *

UNITED STATES PATENT AND TRADEMARK OFFICE
CERTIFICATE OF CORRECTION

PATENT NO.        : 8,209,382 B2
APPLICATION NO.   : 10/667833
DATED             : June 26, 2012
INVENTOR(S)       : Jeyhan Karaoguz et al.

Page 1 of 1

It is certified that error appears in the above-identified patent and that said Letters Patent is hereby corrected as shown below:

In the Claims

Col. 16, line 5, in claim 2: after "claim 1" insert --,--
Col. 17, line 64, in claim 25: replace "set to box" with --set top box--
Col. 17, line 65, in claim 25: replace "set to box" with --set top box--

Signed and Sealed this
Sixth Day of August, 2013

Teresa Stanek Rea
*Acting Director of the United States Patent and Trademark Office*